United States Patent
Mobley et al.

(10) Patent No.: US 12,495,929 B2
(45) Date of Patent: Dec. 16, 2025

(54) PORTABLE GRILL

(71) Applicant: GRILL RESCUE LLC, Palm City, FL (US)

(72) Inventors: Scott Jacob Mobley, Palm City, FL (US); Anthony Tranchida, Palm City, FL (US)

(73) Assignee: Grill Rescue LLC, Palm City, FL (US)

( * ) Notice: Subject to any disclaimer, the term of this patent is extended or adjusted under 35 U.S.C. 154(b) by 365 days.

(21) Appl. No.: 18/305,974

(22) Filed: Apr. 24, 2023

(65) Prior Publication Data

US 2023/0346163 A1 Nov. 2, 2023

Related U.S. Application Data

(60) Provisional application No. 63/336,416, filed on Apr. 29, 2022.

(51) Int. Cl.
*A47J 37/07* (2006.01)

(52) U.S. Cl.
CPC .... *A47J 37/0763* (2013.01); *A47J 2037/0777* (2013.01)

(58) Field of Classification Search
CPC ............ A47J 37/0763; A47J 2037/0777
See application file for complete search history.

(56) References Cited

U.S. PATENT DOCUMENTS

| | | | | |
|---|---|---|---|---|
| D976,048 S | * | 1/2023 | Sullivan | D7/332 |
| D980,957 S | * | 3/2023 | Hong | D23/332 |
| 2012/0204852 A1 | * | 8/2012 | Boucher | F24C 1/16 |
| | | | | 126/30 |
| 2019/0254477 A1 | * | 8/2019 | Skillman | A47J 37/0763 |
| 2021/0063017 A1 | * | 3/2021 | Poggi | F24C 3/082 |
| 2021/0361116 A1 | * | 11/2021 | Battel | F24C 3/14 |
| 2023/0111532 A1 | * | 4/2023 | Nagatsuma | F24B 1/207 |
| | | | | 126/9 R |

FOREIGN PATENT DOCUMENTS

KR 101619440 * 5/2016

* cited by examiner

*Primary Examiner* — Alfred Basichas
(74) *Attorney, Agent, or Firm* — Kilpatrick Townsend & Stockton LLP

(57) ABSTRACT

A portable grill can include a first structural panel, a second structural panel, and a third structural panel. The first structural panel can include a first body, a first side slot sized to receive a second side slot, and a first opening sized to receive a first protrusion. The second structural panel can include a second body, the second side slot that is sized to receive the first side slot, a second opening sized to receive a second protrusion, and a set of horizontal slots positioned vertically spaced apart and sized to receive at least one grill surface. The third structural panel can include the first protrusion that is sized to be positioned in the first opening. The third structural panel can additionally include the second protrusion that is sized to be positioned in the second opening.

15 Claims, 12 Drawing Sheets

PORTABLE GRILL

CROSS-REFERENCE TO RELATED APPLICATION

This application claims priority to U.S. Provisional Application No. 63/336,416 filed Apr. 29, 2022, the entire content of which is hereby incorporated for all purposes in its entirety.

TECHNICAL FIELD

The present disclosure relates generally to cooking equipment and, more particularly (although not necessarily exclusively), to a portable grill that can be assembled at the point of use and disassembled after use.

BACKGROUND

Camping and picnicking and grilling are common pastimes. Typically, if a group is planning to grill at a location that does not have built-in grills provided, they will bring their own portable grill. However, portable grills can be cumbersome to transport and messy to clean.

SUMMARY

In some embodiments, a portable grill that can be assembled at the point of use and disassembled after use. The grill is made of a plurality of substantially flat panels that can be assembled to one another in order to form a functional grill. In a particular example, the portable grill can include a front panel, a back panel, two side panels, and at least one grill surface panel. The grill surface panel can generally include a grid panel that allows fluid to flow through grates. Additionally or alternatively, it is possible to provide the grill surface panel as a flat-panel, which provides a solid surface for cooking eggs, pancakes, scallops, or other items that would potentially fall through grates. Optional grill handles may also be provided that allow the user to lift and re-position the grill surface panel(s).

DETAILED DESCRIPTION

Certain aspects and examples of the present disclosure relate to a portable grill that is provided as a series of panels. The portable grill can be assembled at a point of use, such as a campsite, a picnic location, or the like, and can be disassembled after use. For example, the series of panels can be assembled at the point of use to form the portable grill, the portable grill can be used (e.g., to cook one or more food items or to perform one or more other suitable functions of the portable grill), and the portable grill can be disassembled into the series of panels. The series of panels can include two or more panels. For example, the series of panels can include a front panel, a back panel, at least one side panel, at least one grill surface, and the like. The series of panels can fit together to form the portable grill. For example, the front panel and the back panel may interlock with the at least one side panel to form a structure for the portable grill, and the at least one grill surface may interlock with one or more of the front panel, the back panel, or the at least one side panel to provide a surface on which to grill.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
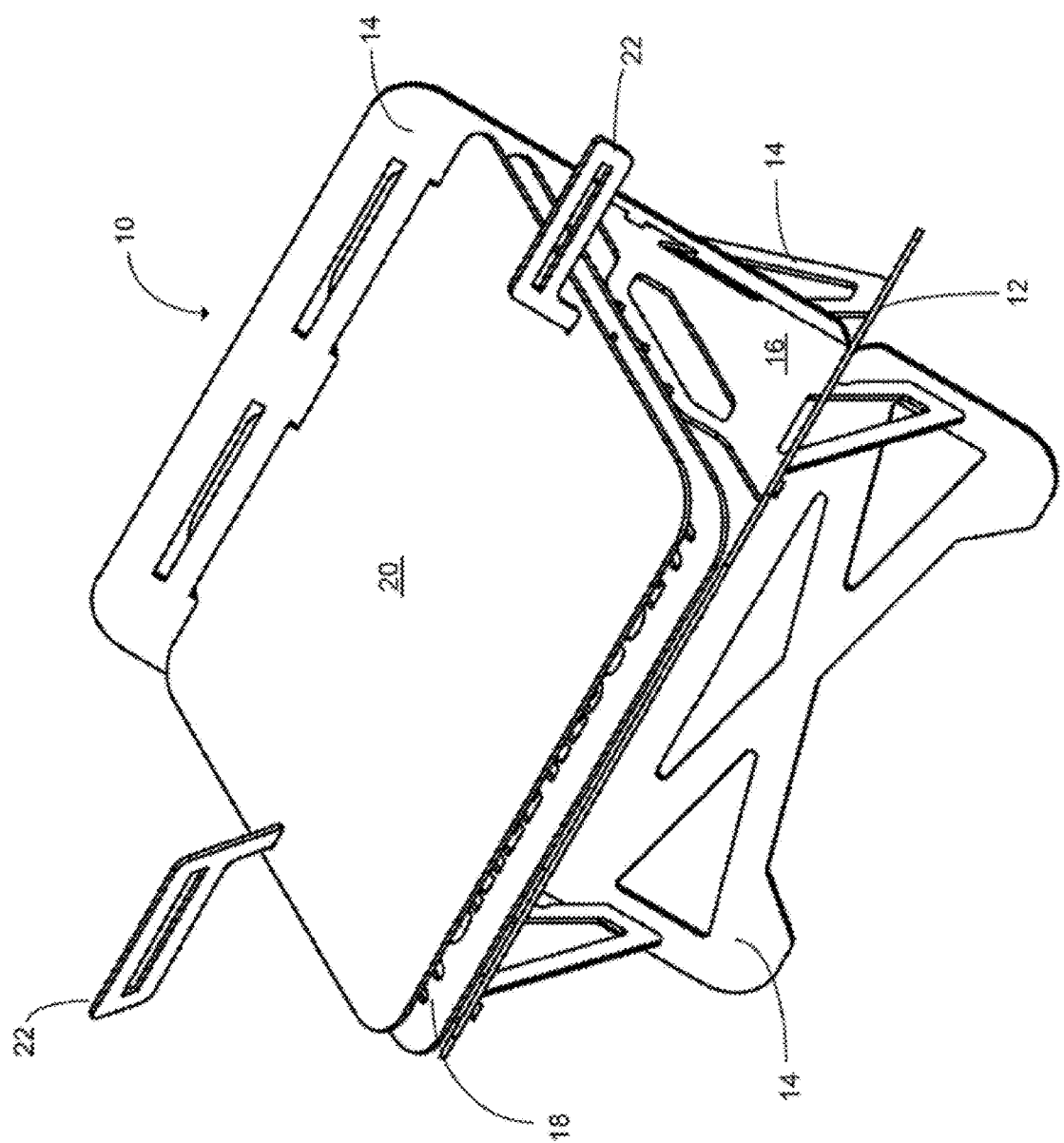
FIG. 1 is a perspective view of one embodiment of a portable grill in an assembled configuration according to various aspects of the present disclosure.
Figure 2:
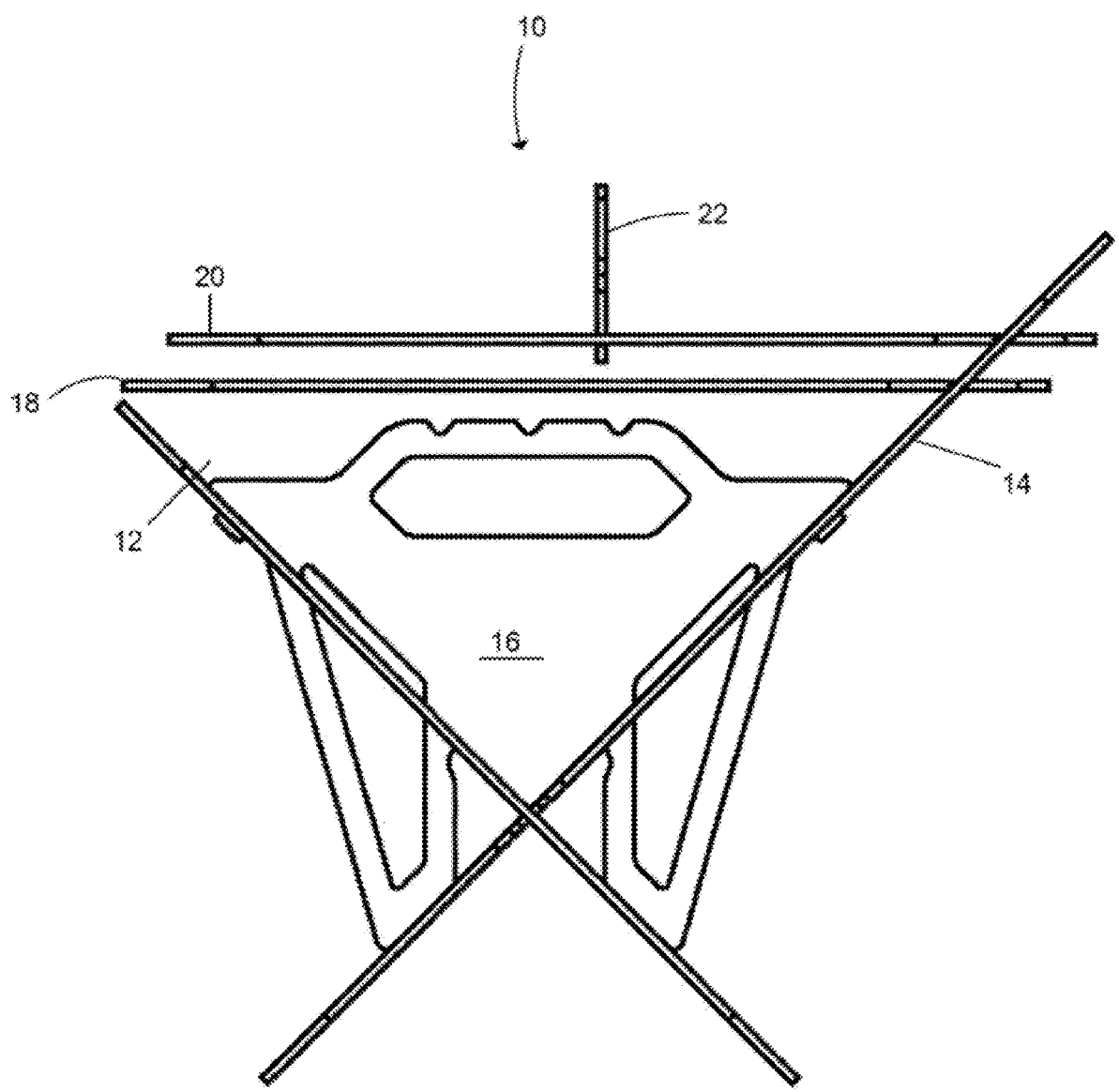
FIG. 2 is a side plan view of the portable grill of FIG. 1.

FIG. 1 is a perspective view of one embodiment of a portable grill 10 in an assembled configuration according to various aspects of the present disclosure, and FIG. 2 is a side plan view of the portable grill 10 of FIG. 1. As illustrated in FIGS. 1 and 2, the portable grill 10 can include a front panel 12, a back panel 14, two side panels 16, and at least one grill surface. The portable grill 10, or any component thereof, may be made of or otherwise include materials suitable for cooking or otherwise receiving heat. For example, the portable grill 10, or any component thereof, may be or include steel or steel alloy, aluminum or aluminum alloy, ceramic, heat-tolerant polymer, or other suitable materials.

In some examples, the at least one grill surface may include a first grill surface 18 and/or a second grill surface 20. The first grill surface 18 may be or include a grill grate that can include slots therethrough that allow cooking juices and other liquids to flow through the grate. The first grill surface 18 may additionally facilitate heat dissipation, heat transfer, or a combination thereof. The second grill surface 20 may be or include a solid grill surface that may not include grates or slots. The second grill surface 20 may be or include a generally flat panel, which can provide a solid surface for cooking eggs, pancakes, scallops, or other items that may potentially fall through grates or other openings.

As illustrated by FIGS. 1 and 2, the portable grill 10 can be assembled with the first grill surface 18, the second grill surface 20, or a combination thereof positioned in place. In some examples, the first grill surface 18 can be positioned below the second grill surface 20, but it should be understood that the illustrated arrangement may be changed if desired, depending upon the type of food being cooked and desired heat levels. For example, the first grill surface 18 may alternatively be positioned above the second grill surface 20. Additionally, and as illustrated by FIGS. 1-2, the portable grill 10 may include one or more handles 22, which may be optional. The one or more handles 22 may be used to reposition the first grill surface 18, the second grill surface 20, or a combination thereof.

Figure 3:
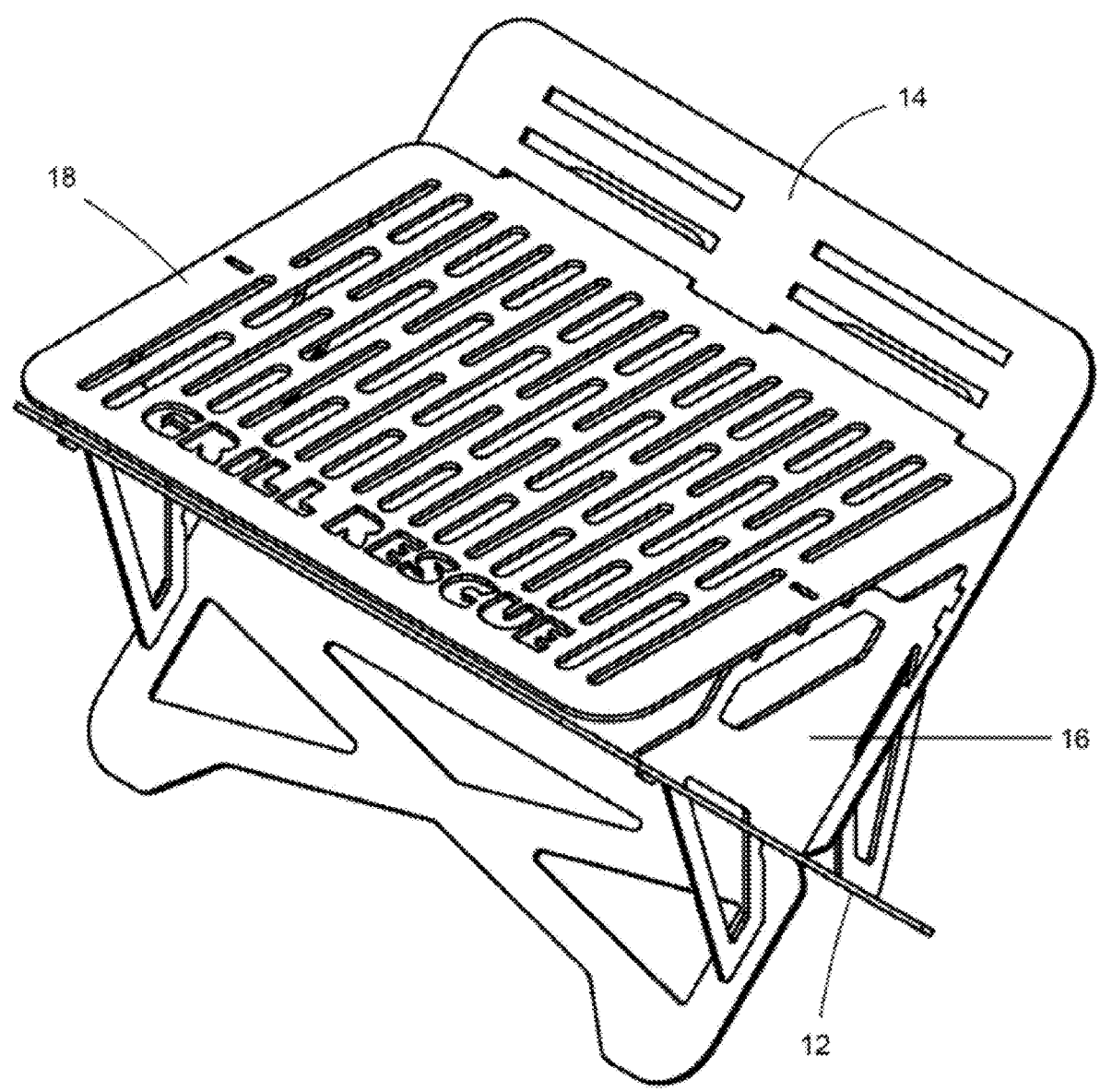
FIG. 3 is a perspective view of a portable grill in an assembled configuration without one or more handles and with a single grill surface in use according to various aspects of the present disclosure.
Figure 4:
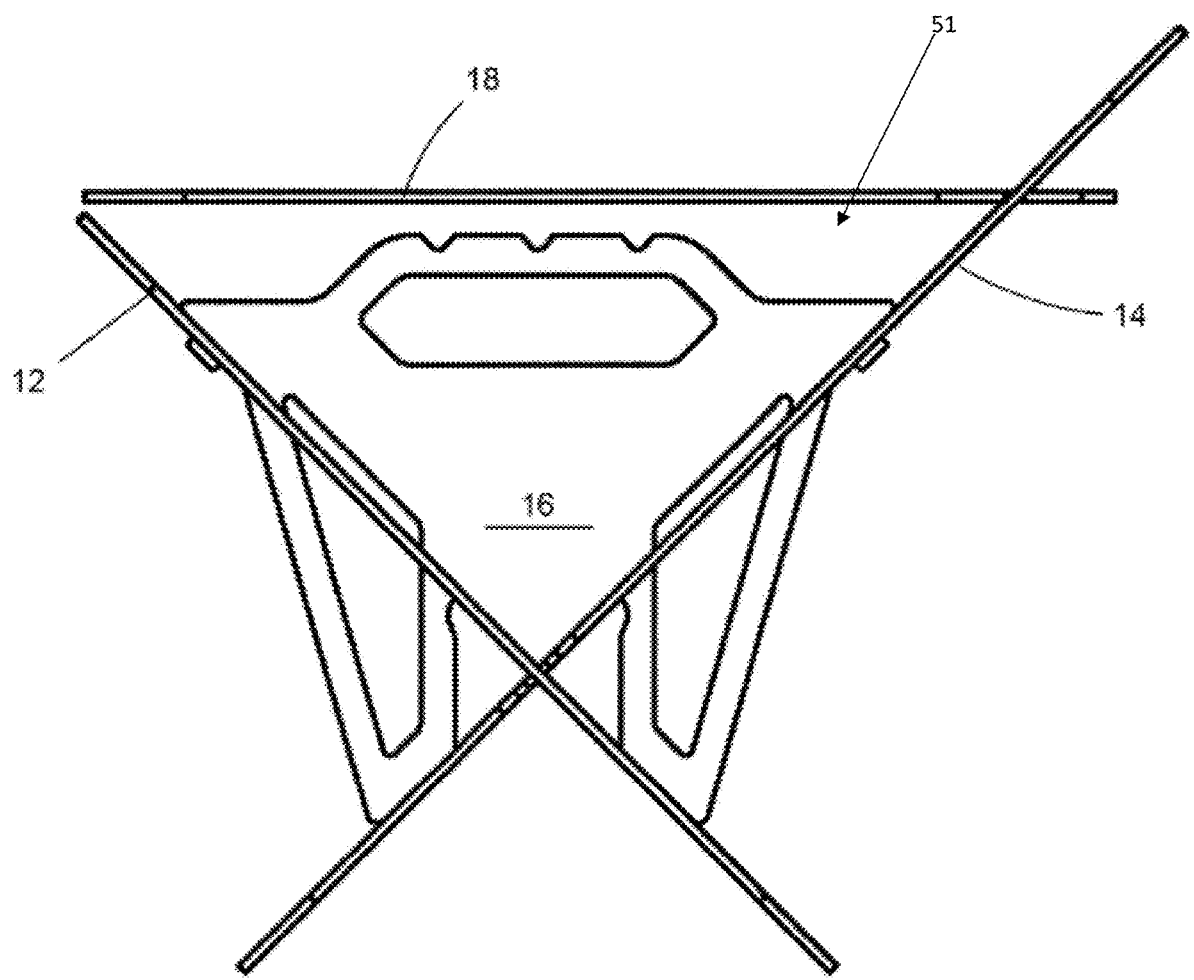
FIG. 4 is a side plan view of the portable grill of FIG. 3.

FIG. 3 is a perspective view of a portable grill 10 in an assembled configuration and without one or more handles 22 and with a single grill surface in use according to various aspects of the present disclosure, and FIG. 4 is a side plan view of the portable grill 10 of FIG. 3. As illustrated in FIGS. 3-4, the portable grill 10 may include the front panel 12, the back panel 14, the two side panels 16, and the at least one grill surface. The at least one grill surface may include the first grill surface 18 positioned in place without the second grill surface 20. Additionally, and as further illustrated by FIGS. 3-4, the portable grill 10 may not include the one or more handles 22.

Figure 5:
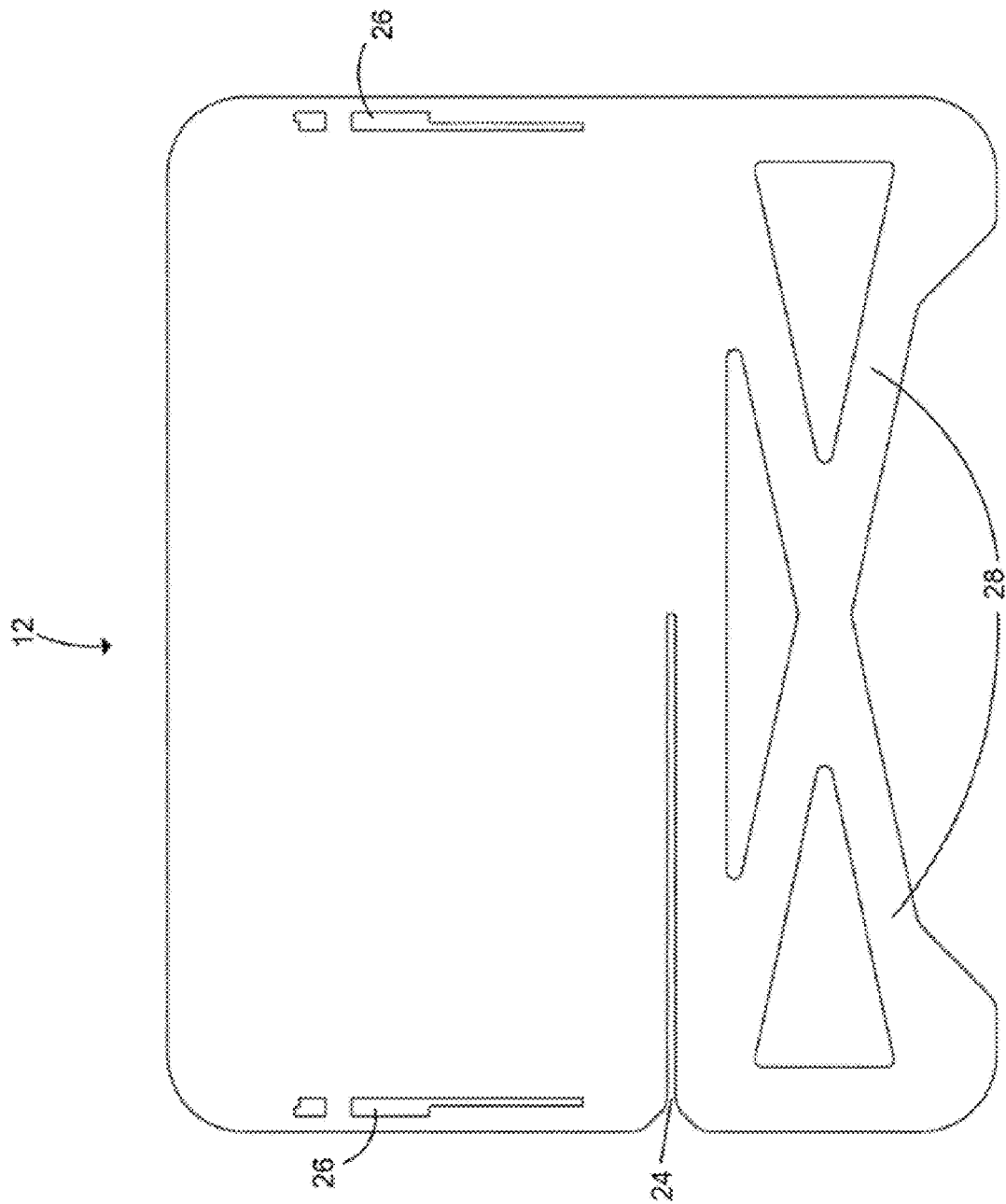
FIG. 5 is a top plan view of a front panel of a portable grill according to various aspects of the present disclosure.

FIG. 5 is a top plan view of a front panel 12 of a portable grill 10 according to various aspects of the present disclosure. FIG. 5 illustrates one possible embodiment of the front panel 12. As illustrated, the front panel 12 may include a side slot 24. During assembly of the portable grill 10, the side slot 24 of the front panel 12 can interlock with or otherwise fit into place with respect to a side slot 30 of the back panel 14. The front panel 12 can additionally include one or more side leg receivers 26 along one or both edges of the front panel 12. The side leg receivers 26 may receive protrusions 40 of the side panel 16. The front panel 12 may additionally include legs 28, which can provide structural support to the portable grill 10 once in the assembled configuration.

Figure 6:
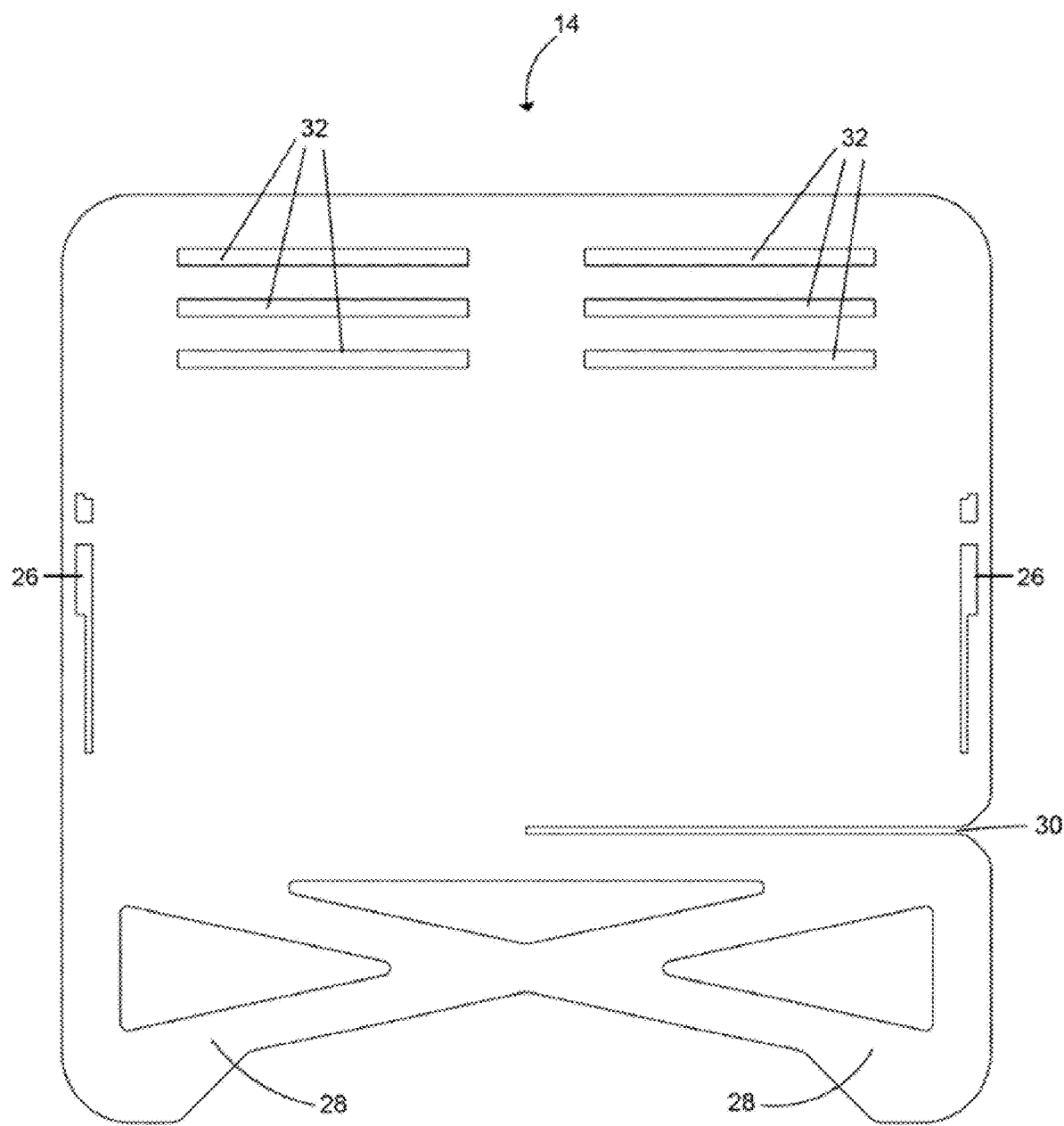
FIG. 6 is a top plan view of a back panel of a portable grill according to various aspects of the present disclosure.

FIG. 6 is a top plan view of a back panel 14 of a portable grill 10 according to various aspects of the present disclosure. FIG. 6 illustrates one possible embodiment of the back panel 14. As illustrated in FIG. 6, the back panel 14 can include the side slot 30. The side slot 30 may be located on an opposite side of the back panel 14 with respect to the side slot 24 of the front panel 12. The position of the side slot 24 and the side slot 30 can allow the side slot 24 to slidingly engage with the side slot 30 in order to secure the front panel 12 and the back panel 14 to one another, which can provide a secure structural base for the portable grill 10. The back panel 14 may additionally include side leg receivers 26, which may be similar to those as provided with respect to the front panel 12. The side leg receivers 26 may receive protrusions 40 of one or more of the side panels 16. Additionally, the back panel 14 may include legs 28, which can provide structural support to the portable grill 10 once in the assembled configuration.

The back panel 14 may additionally include one or more grill surface receivers 32. As illustrated in FIG. 6, the grill surface receivers 32 can be or include a set of slots or a set of openings positioned on a side of the back panel 14 that is opposite from the legs 28. As illustrated in FIGS. 1-4, the grill surface receivers 32 may be used to receive and/or support a rear element 40 of the first grill surface 18 and/or the second grill surface 20. The figures illustrate sets of three pairs of grill surface receivers 32; however, it should be understood that any other number (e.g., less than three or more than three) of grill surface receivers 32 in any appropriate shape is possible and considered within the scope of the present disclosure. The grill surface receivers 32 may generally receive and stabilize rear elements of one or more grill surfaces so that the one or more grill surfaces can remain generally parallel with the ground surface on which the grill is positioned.

Figure 7:
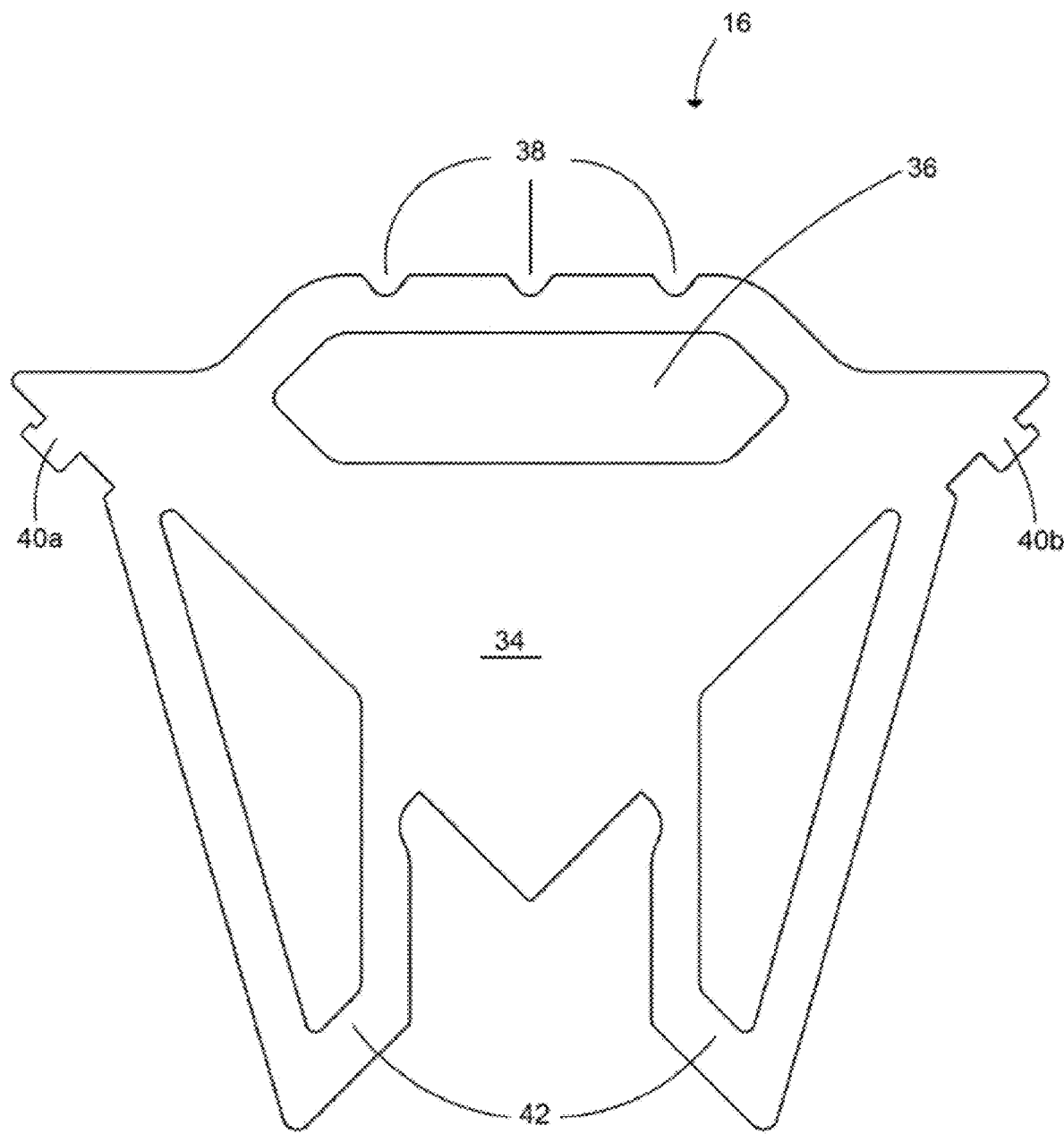
FIG. 7 is a top plan view of a side panel of a portable grill according to various aspects of the present disclosure.

FIG. 7 a top plan view of a side panel 16 of a portable grill 10 according to various aspects of the present disclosure. FIG. 7 illustrates one possible embodiment of the side panel 16. In some examples, the portable grill 10 may be assembled using two side panels 16 that may be approximately identical in shape to one another. The side panel 16 may generally have a triangular-shaped middle body 34, though other suitable shapes (e.g., a square, a rectangle, a pentagon, irregular shapes, and the like) are possible for the side panel 16. A finger grip opening 36 can be shaped into an upper area of the middle body 34 of the side panel 16. The finger grip opening 36 can allow a user of the portable grill 10 to grasp the portable grill 10, for example in an assembled configuration, and move the portable grill 10 to a different location or otherwise adjust a positioning, if desired, of the portable grill 10. The finger grip opening 36 may include a set of grooves 38, which may, in some examples, facilitate a substantially flat grilling surface for the portable grill 10. The set of grooves 38 may include one or more grooves and may be or include skewer holders. For example, rather than using the first grill surface 18 and/or the second grill surface 20, a user may position skewers across the side panels 16, for example in the set of grooves 38, in order to grill items on the skewers that extend at an angle (e.g., acute, right, obtuse, reflex, etc.) with respect to the back panel 14.

As illustrated in FIG. 7, the side panel 16 may additionally include protrusions 40. The side panel 16 may include a front protrusion 40a and a rear protrusion 40b, though other suitable protrusions are possible for the side panel 16. The protrusions 40 can be received by side leg receivers 26 of the front panel 12 and/or the back panel 14. In some examples, the front protrusion 40a can be received by side leg receivers 26 on the front panel 12, and the rear protrusion 40b can be received by side leg receivers 26 on the back panel 14. The side panels 16 can additionally include supporting legs 42, which may rest upon (e.g., abut) relevant portions of the front panel 12 and/or the back panel 14, for example as illustrated by FIGS. 2 and 4. Once the front panel 12, the back panel 14, and the one or more side panels 16 have been assembled, a triangular cavity 51 therebetween can be formed. The triangular cavity 51 can be used to hold charcoal, wood, or any other flame source or heat source.

Figure 8:
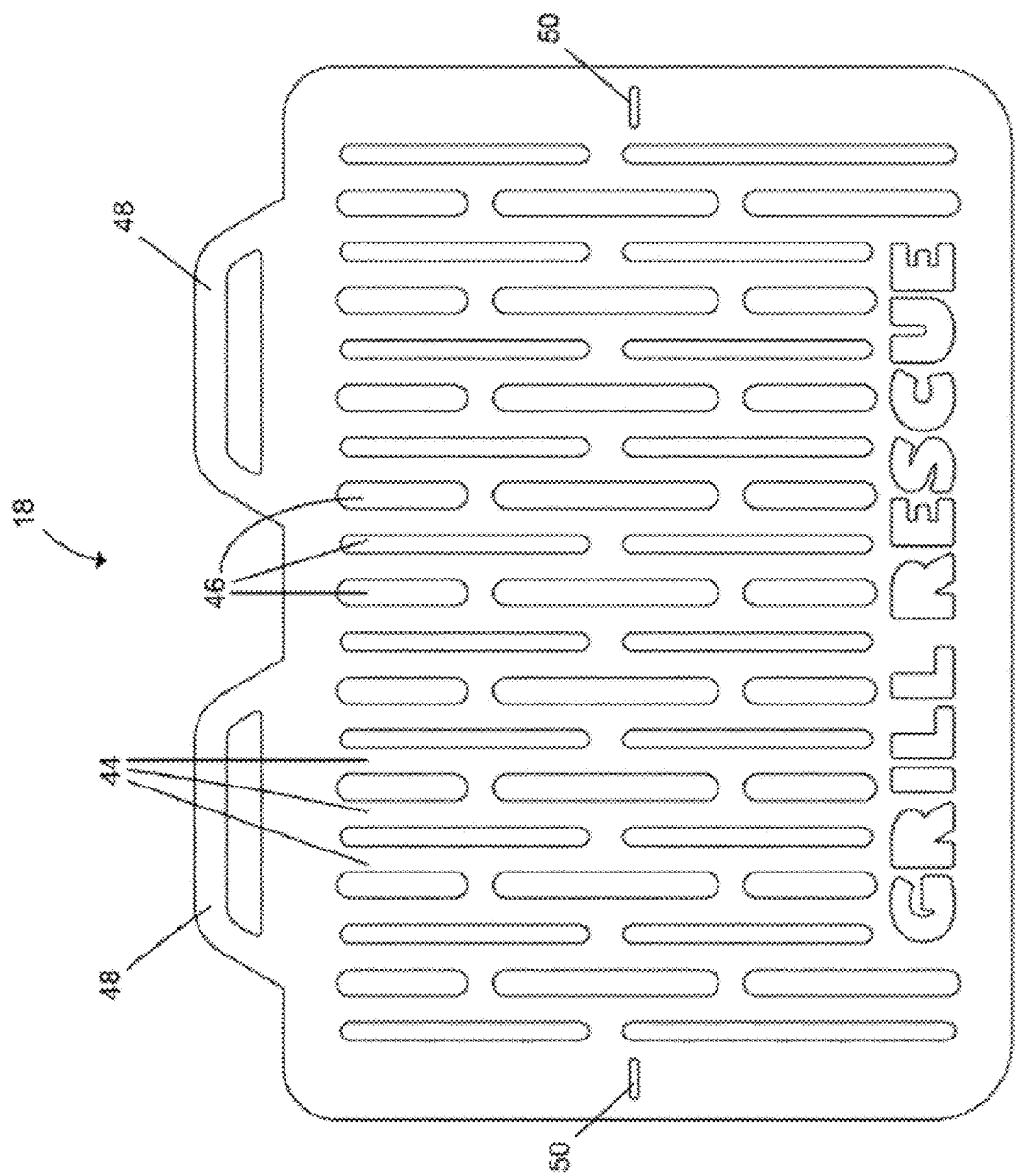
FIG. 8 is a top plan view of a grated grill surface of a portable grill according to various aspects of the present disclosure.

FIG. 8 is a top plan view of a grated grill surface, such as the first grill surface 18, of a portable grill 10 according to various aspects of the present disclosure. FIG. 8 illustrates one embodiment of the first grill surface 18 that can be formed with a set of grates 44 defined by openings 46 in the first grill surface 18. The openings 46 are illustrated as elongated ovals, but it should be understood that any shape (e.g., a circle, a square, a rectangle, a pentagon, irregular shapes, and the like) is possible and considered within the scope of this disclosure. The openings 46 may facilitate heat transfer and may allow food juices or other fluids to flow through the first grill surface 18. The first grill surface 18 may also include rear elements 48, which may be designed to interlock or otherwise cooperate with the grill surface receivers 32 of the back panel 14. Two rear elements 48 are illustrated, which may allow stabilization of the first grill surface 18 with respect to the back panel 14. However, it should be understood that different shapes and numbers of rear elements 48 may be provided and are considered within the scope of this disclosure. The first grill surface 18 may also include handle receivers 50. The handle receivers 50 may be configured to receive a connecting portion or extending finger 52 of one of the one or more handles 22.

Figure 9:
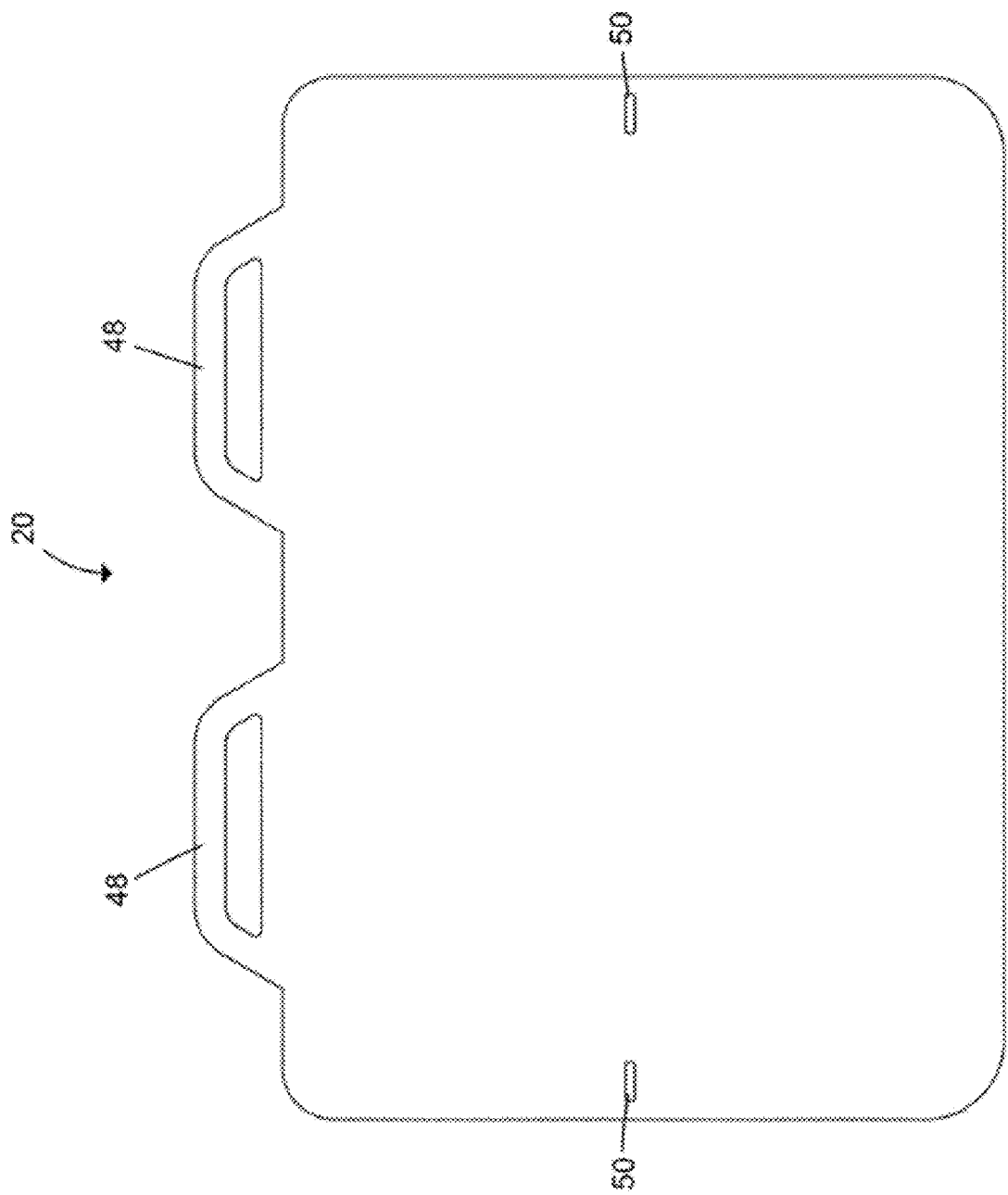
FIG. 9 is a top plan view of a solid flat grill surface of a portable grill according to various aspects of the present disclosure.

FIG. 9 is a top plan view of a solid flat grill surface, such as the second grill surface 20, of a portable grill 10 according to various aspects of the present disclosure. FIG. 9 illustrates one possible embodiment of the second grill surface 20 that can be or include a flat, solid surface. The second grill surface 20 may be similar in outer profile to the first grill surface 18 such that the first grill surface 18 and the second grill surface 20 may be stacked upon one another in use, though spaced a distance from one another in order to encourage heat transfer. The second grill surface 20 may also include rear elements 48. The second grill surface 20 may be used to catch grease or other run off from the first grill surface 18. Additionally or alternatively, the second grill surface 20 may be used on its own as a flat solid grill surface.

Figure 10:
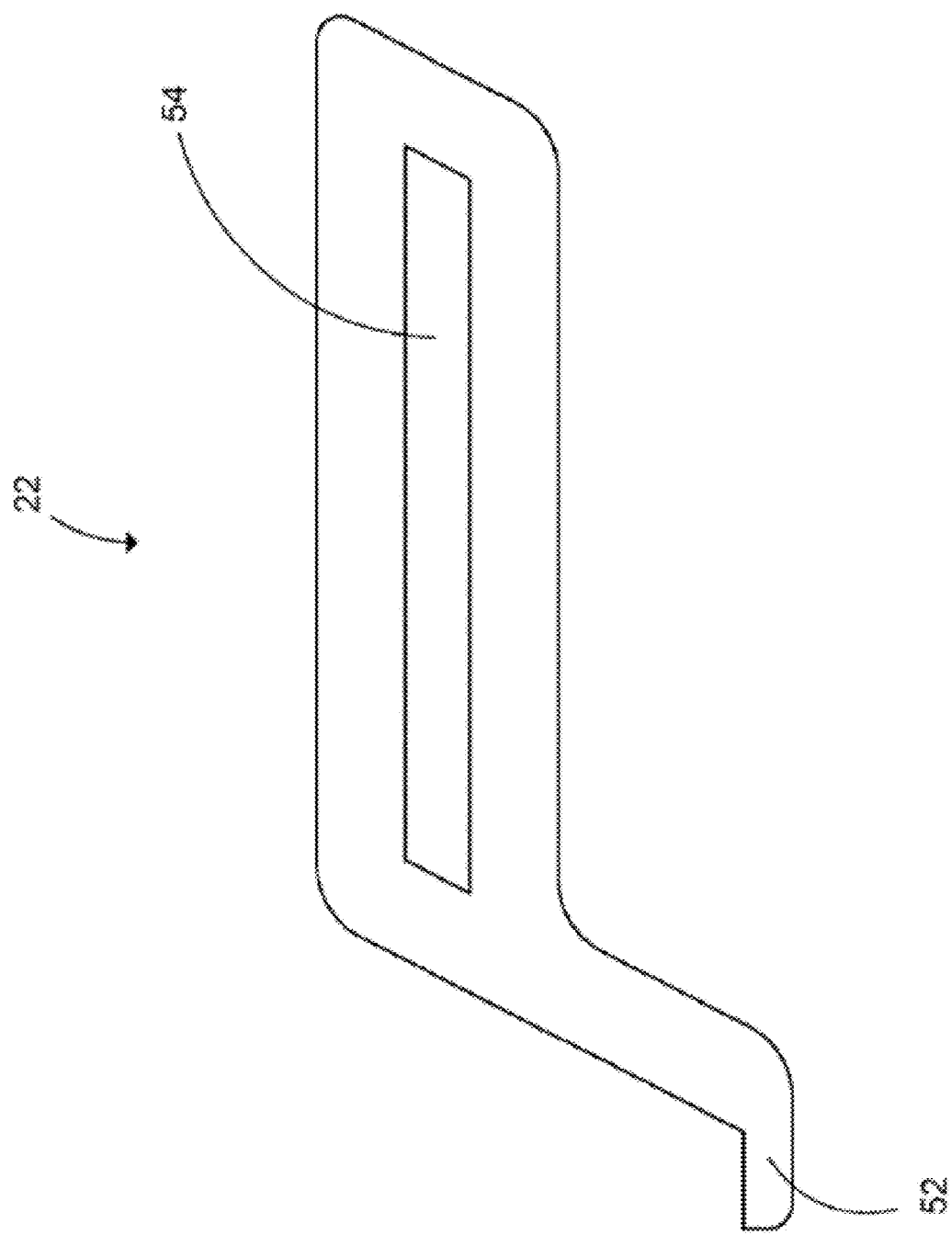
FIG. 10 is a side plan view of optional handles of a portable grill according to various aspects of the present disclosure.

FIG. 10 is a side plan view of optional handles of a portable grill 10 according to various aspects of the present disclosure. FIG. 10 illustrates one possible embodiment of the one or more handles 22. In examples in which the one or more handles 22 includes two handles, the two handles may generally be mirror images of one another. The one or more handles 22 may be used in order to allow a user to remove and/or replace the first grill surface 18 and/or the second grill surface 20 with respect to the back panel 14 in order to raise, lower, or completely remove the first grill surface 18 and/or the second grill surface 20. The first grill surface 18 and/or the second grill surface 20 may include handle receivers 50, which may be shaped and designed to receive an extending finger 52 of the one or more handles 22. The one or more handles 22 may also include a grip opening 54 that can allow a user to securely grasp the handle and insert the extending finger 52 into one of the handle receivers 50 (two handles are typically used and inserted the same way) in order to lift or otherwise move the first grill surface 18 and/or the second grill surface 20.

Figure 11:
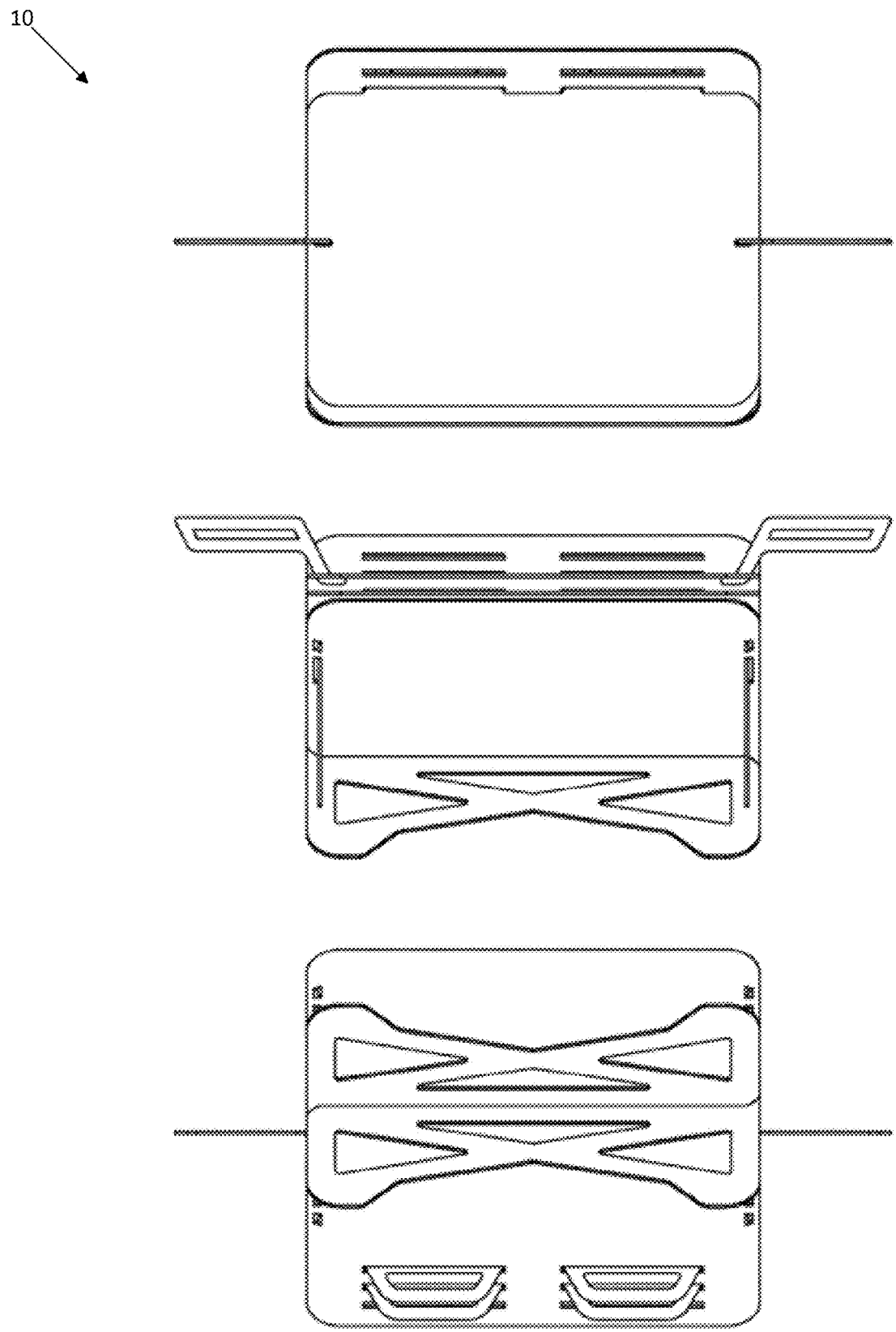
FIG. 11 is a set of views of a portable grill with optional handles according to various aspects of the present disclosure.
Figure 12:
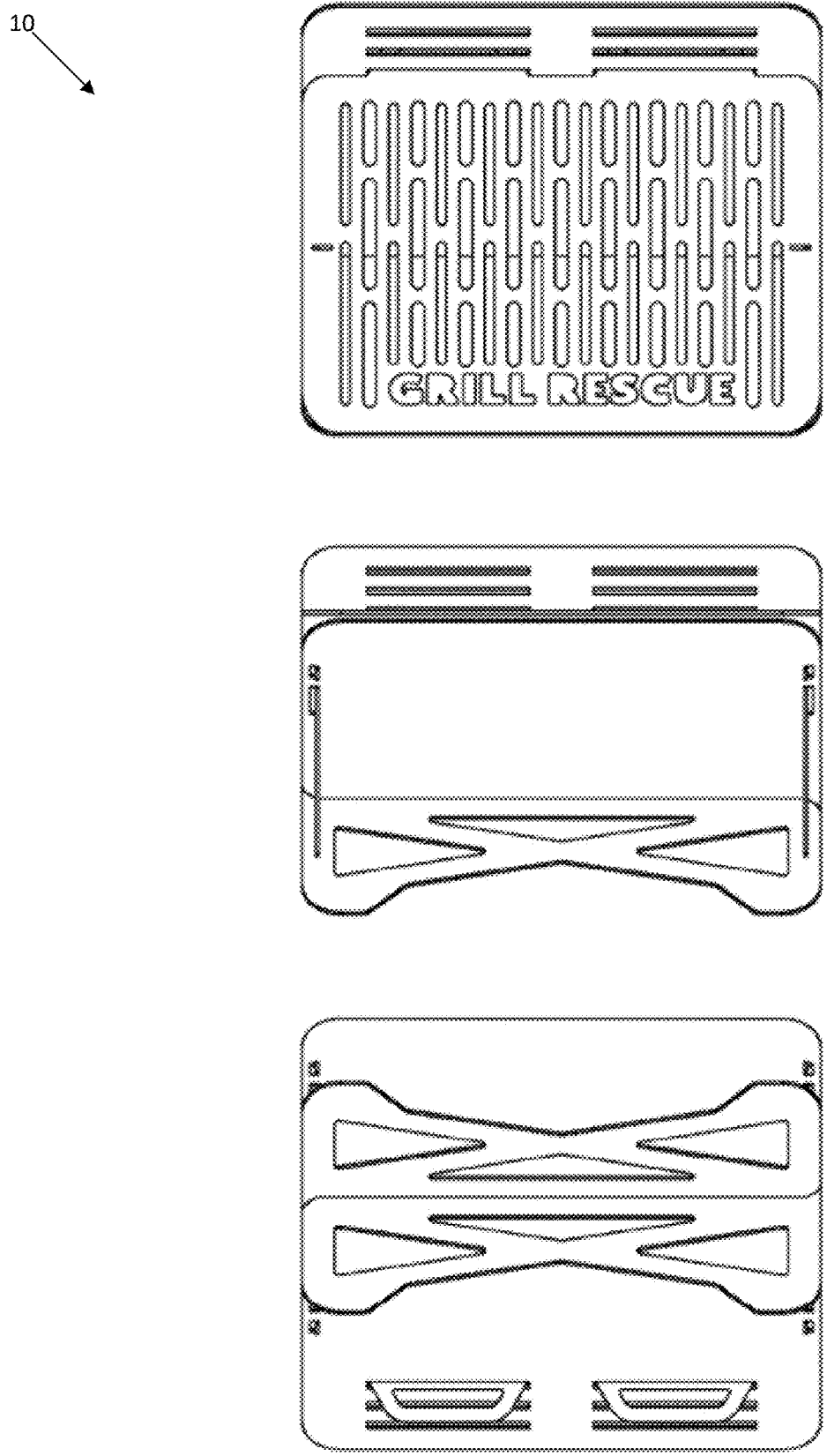
FIG. 12 is a set of views of an assembled portable grill according to various aspects of the present disclosure.

FIG. 11 is a set of views of a portable grill 10 with optional handles according to various aspects of the present disclosure, and FIG. 12 is a set of views of a portable grill 10 in an assembled configuration according to various aspects of the present disclosure.

The portable grill 10 can be assembled in one or more particular orders. In a particular example, and while understanding that other examples are possible, the front panel 12 can initially be coupled with the back panel 14 by positioning the side slot 24 in the side slot 30. By positioning the side slot 24 in the side slot 30, the front panel 12 and the back panel 14 may form an X shape or may otherwise be crossed with respect to one another. Additionally, at least one side panel 16 can be coupled to the front panel 12 and the back panel 14 via positioning the protrusions 40 and the supporting legs 42 in the one or more side leg receivers 26. Additionally, the first grill surface 18, the second grill surface 20, or a combination thereof can be positioned in one or more of the horizontal slots such as the grill surface receivers 32.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations.

Embodiments of the invention have been described for illustrative and not restrictive purposes, and alternative embodiments will become apparent to readers of this patent. Changes and modifications, additions and deletions may be made to the structures and methods recited above and shown in the drawings without departing from the scope or spirit of the invention disclosure.

What is claimed is:

1. A portable grill comprising:
   a first structural panel comprising:
      a first body;
      a first side slot sized to receive a second side slot; and
      a first opening sized to receive a first protrusion;
   a second structural panel comprising:
      a second body;
      the second side slot that is sized to receive the first side slot;
      a second opening sized to receive a second protrusion; and
      a set of horizontal slots positioned vertically spaced apart and sized to receive at least one grill surface; and
   a third structural panel comprising:
      the first protrusion that is sized to be positioned in the first opening;
      the second protrusion that is sized to be positioned in the second opening;
      a first supporting leg sized to be positioned in the first opening along with the first protrusion; and
      a second supporting leg sized to be positioned in the second opening along with the second protrusion.

2. The portable grill of claim 1, wherein:
   the first structural panel is couplable with the second structural panel via the first side slot and the second side slot; and
   the third structural panel is positionable between the first structural panel and the second structural panel to position (i) the first protrusion and the first supporting leg in the first opening and (ii) the second protrusion and the second supporting leg in the second opening.

3. The portable grill of claim 1, wherein the first structural panel, the second structural panel, and the third structural panel are combinable to form an approximately triangular cavity between the first structural panel, the second structural panel, and the third structural panel.

4. The portable grill of claim 3, wherein:
   the set of horizontal slots include two or more slots that are substantially parallel to a ground surface on which the portable grill is disposed; and
   the two or more slots provide two or more different height settings with respect to the approximately triangular cavity.

5. The portable grill of claim 3, further comprising the at least one grill surface, wherein the at least one grill surface comprises a first grill surface having one or more grates and a second grill surface having a solid surface, and wherein the first grill surface is positioned on a different horizontal slot of the set of horizontal slots with respect to the second grill surface.

6. The portable grill of claim 1, wherein the first structural panel is configured to be coupled with the second structural panel via the first side slot and the second side slot, and wherein, in a coupled configuration, the first structural panel and the second structural panel form approximately an X shape.

7. The portable grill of claim 1, further comprising a fourth structural panel configured to be coupled with the first structural panel at a first end of the first structural panel and with the second structural panel at a first end of the second structural panel, wherein the third structural panel is couplable with the first structural panel at a second end of the first structural panel and with the second structural panel at a second end of the second structural panel, wherein the first end of the first structural panel is opposite the second end of the first structural panel, wherein the first end of the second structural panel is opposite the second end of the second structural panel, and wherein the fourth structural panel is substantially the same as the third structural panel.

8. A method comprising:
coupling a first structural panel to a second structural panel, wherein:
the first structural panel comprises:
a first body;
a first side slot sized to receive a second side slot; and
a first opening sized to receive a first protrusion; and
the second structural panel comprises:
a second body;
the second side slot that is sized to receive the first side slot;
a second opening sized to receive a second protrusion; and
a set of horizontal slots positioned vertically spaced apart and sized to receive at least one grill surface;
coupling at least a third structural panel to the first structural panel and the second structural panel, wherein the third structural panel comprises:
the first protrusion that is sized to be positioned in the first opening;
the second protrusion that is sized to be positioned in the second opening;
a first supporting leg sized to be positioned in the first opening along with the first protrusion; and
a second supporting leg sized to be positioned in the second opening along with the second protrusion, wherein coupling at least a third structural panel to the first structural panel and the second structural panel includes:
positioning the first protrusion and the first supporting leg in the first opening; and
positioning the second protrusion and the second supporting leg in the second opening; and
coupling the at least one grill surface to at least one horizontal slot of the set of horizontal slots.

9. The method of claim 8, wherein coupling the first structural panel to the second structural panel includes positioning the first side slot in the second side slot to couple the first structural panel with the second structural panel.

10. The method of claim 9, wherein positioning the first side slot in the second side slot causes the first structural panel and the second structural panel to form an X shape.

11. A portable grill comprising:
a front panel comprising a side slot extending inwardly from a side of the front panel
a back panel comprising a side slot extending inwardly from a side of the back panel, the side slots of the front panel and the back panel configured to slidably interlock the front panel and the back panel together, the back panel further comprising one or more grill panel receivers positioned proximal a top of the back panel;
a first side panel, the front panel and the back panel configured to interlock with the first side panel, the first side panel comprising:
a first supporting leg, wherein a first side panel receiver slot of the front panel is configured to receive the first supporting leg of the first side panel such that the first supporting leg extends through the first side panel receiver slot of the front panel and rests upon a portion of the back panel; and
a second supporting leg, wherein a second side panel receiver slot of the back panel is configured to receive the second supporting leg of the first side panel such that the second supporting leg extends through the second side panel receiver slot of the back panel and rests upon a portion of the front panel;
a second side panel, the front panel and the back panel configured to interlock with the second side panel; and
a grill panel, the one or more grill panel receivers configured to receive portions of the grill panel.

12. The portable grill of claim 11, wherein:
the front panel further comprises (i) the first side panel receiver slot extending along the side of the front panel and (ii) the second side panel receiver slot extending along an opposite side of the front panel;
the back panel further comprises (i) a first side panel receiver slot extending along the side of the back panel and (ii) a second side panel receiver slot extending along an opposite side of the back panel;
the first side panel receiver slot of the front panel and the second side panel receiver slot of the back panel are configured to receive portions of the first side panel; and
the second side panel receiver slot of the front panel and the first side panel receiver slot of the back panel are configured to receive portions of the second side panel.

13. The portable grill of claim 12, wherein:
the second side panel further comprises a first supporting leg, the second side panel receiver slot of the front panel configured to receive the first supporting leg of the second side panel such that the first supporting leg extends through the second side panel receiver slot of the front panel and rests upon a portion of the back panel; and
the second side panel further comprises a second supporting leg, the first side panel receiver slot of the back panel configured to receive the second supporting leg of the second side panel such that the second supporting leg extends through the first side panel receiver slot of the back panel and rests upon a portion of the front panel.

14. The portable grill of claim 11, wherein the front panel and the back panel form an X shape when interlocked and viewed from the side.

15. The portable grill of claim 11, wherein the first side panel and the second side panel each further comprise a finger grip opening in a middle body of each side panel.

\* \* \* \* \*